United States Patent [19]
Cook

[11] 3,785,473
[45] Jan. 15, 1974

[54] GLASS CONTAINER ANGULAR DISPLACEMENT DEVICE

[75] Inventor: Charles W. Cook, Muncie, Ind.

[73] Assignee: Ball Corporation, Muncie, Ind.

[22] Filed: Sept. 18, 1970

[21] Appl. No.: 73,528

Related U.S. Application Data

[63] Continuation-in-part of Ser. No. 777,419, Nov. 20, 1968, abandoned.

[52] U.S. Cl. .................................... 198/33 AC
[51] Int. Cl. ........................................ B65g 47/24
[58] Field of Search ............... 198/33 AC, 33 AA, 198/33 AD, 104, 160; 193/43 A

[56] References Cited
UNITED STATES PATENTS

| | | |
|---|---|---|
| 3,495,291 | 2/1970 | Copping et al. ................ 198/33 AC |
| 2,461,277 | 2/1949 | Hohl et al. ..................... 198/33 AA |
| 3,314,522 | 4/1967 | Croall ............................ 198/33 AC |
| 2,604,200 | 7/1952 | Hohl et al. ..................... 198/33 AA |
| 2,974,774 | 3/1961 | Stuart ............................ 198/33 AC |

Primary Examiner—Richard E. Aegerter
Assistant Examiner—Douglas D. Watts
Attorney—Campbell and O'Rourke and Gilbert E. Alberding

[57] ABSTRACT

Apparatus for automatically adjusting the orientation of glass containers, including tilting and/or inverting the containers. The apparatus includes a rotatable worm conveyor and a plurality of guides partially curved about the worm conveyor so that containers received therebetween are caused to be tilted and/or inverted upon rotation of the worm conveyor.

4 Claims, 19 Drawing Figures

INVENTOR.
CHARLES W. COOK
BY
Campbell, Harris & O'Rourke
ATTORNEYS

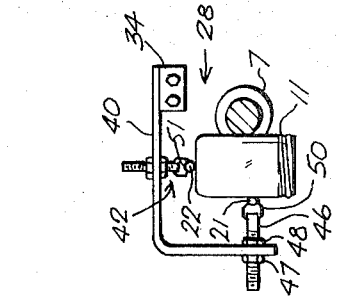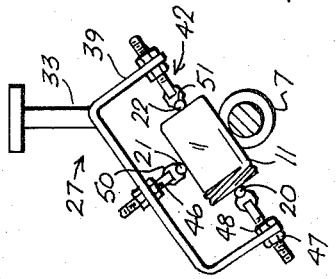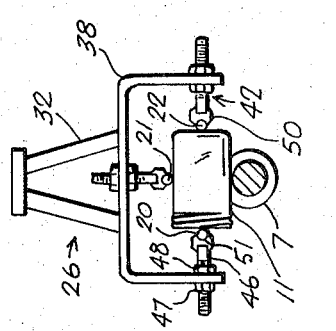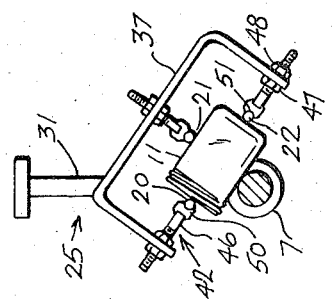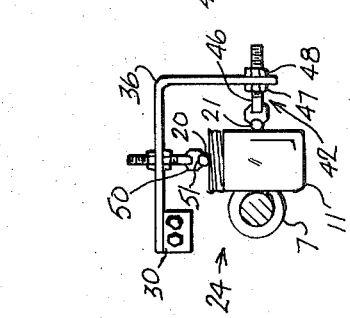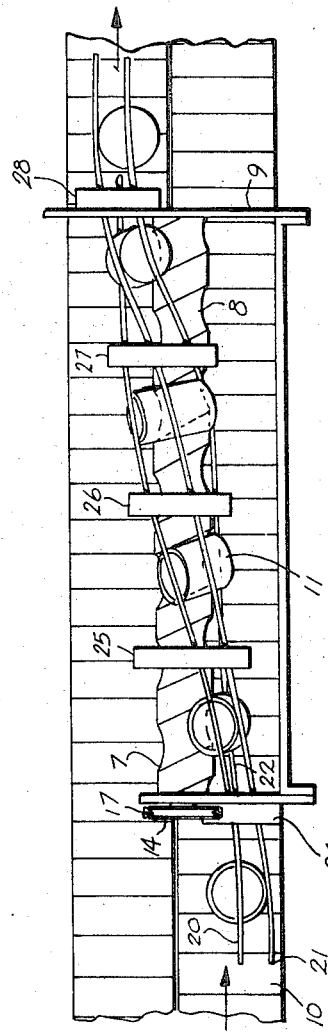

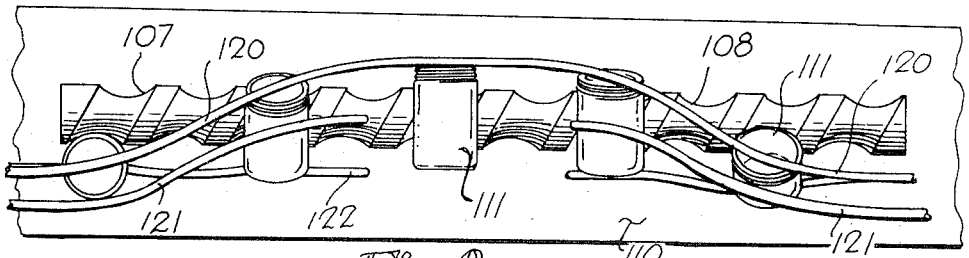
Fig. 9
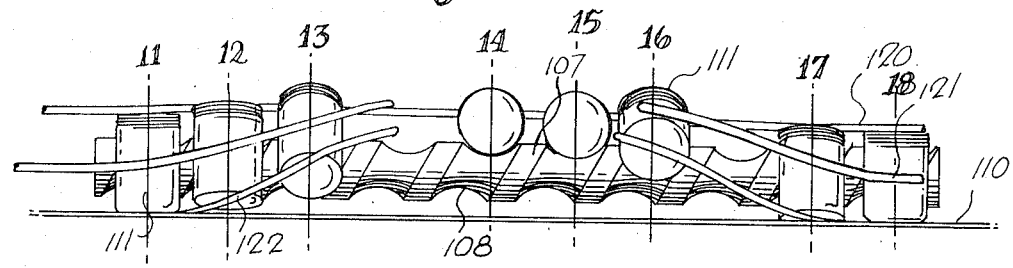
Fig. 10
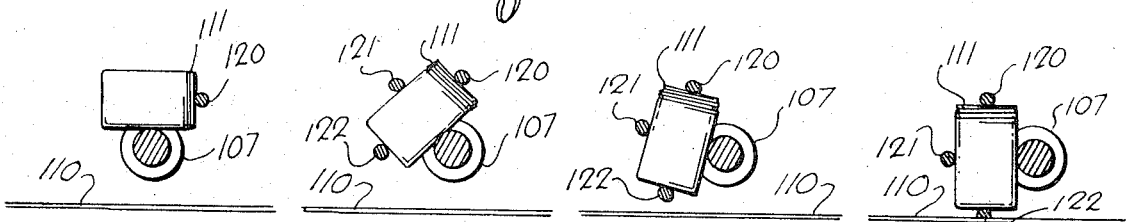
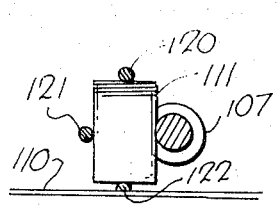
Fig. 15
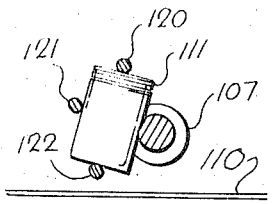
Fig. 16
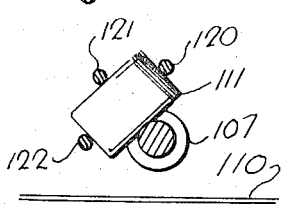
Fig. 17
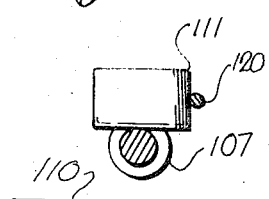
Fig. 18
Fig. 11  Fig. 12  Fig. 13  Fig. 14
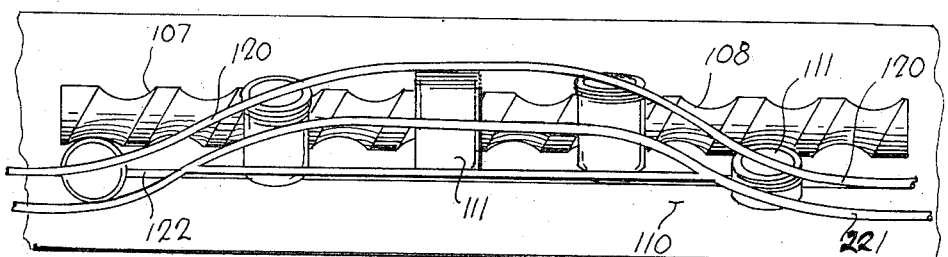
Fig. 19
INVENTOR.
CHARLES W. COOK
BY
ATTORNEYS

GLASS CONTAINER ANGULAR DISPLACEMENT DEVICE

CROSS-REFERENCE TO RELATED APPLICATION

This application is a continuation-in-part of my copending application Ser. No. 777,419, entitled "Glass Container Inverter," filed Nov. 20, 1968, now abandoned.

BACKGROUND OF THE INVENTION

1. Field of the Invention

This invention relates to apparatus for angularly displacing articles, and, more particularly, relates to apparatus for tilting and/or inverting glass containers.

2. Description of the Prior Art

It is oftentimes necessary to angularly displace an article subsequent to formation and/or use. This is particularly true in the glass container field where such containers must often be tilted and/or inverted at least once during processing and subsequent use. For example, in processing newly formed glass containers, it is often necessary, or at least desirable, to either temporarily tilt the container or, in some instances, invert the container for purposes such as inspection of the ware.

While ware, such as glass containers, could, in many cases, be manually tilted or inverted, such a procedure would require constant attention and could limit production capabilities. In addition, at least some such containers should preferably not be manually handled as, for example, where the containers are at elevated temperatures.

While apparatus has been developed heretofore to effect angular displacement of articles, no such apparatus has provided means whereby articles, including glass containers, can be angularly displaced and, in particular, tilted or inverted in a manner that has been found to be completely successful. In some instances, for example, such apparatus has been unsuccessful for use with glass containers due to excessive ware damage and/or inability of the equipment to properly handle the ware to be angularly displaced at the necessary speeds required. In addition, such prior art apparatus has not been found to be completely acceptable due, at least in part, to excessive space requirements and/or a requirement for floor mounting.

Apparatus has also been developed heretofore which includes an inclined twisted chute which inverts ware as it passes therealong under the influence of gravity. This type of apparatus has, however, likewise not proven to be completely successful due, at least in part, to problems encountered because of the necessity for different processing levels at opposite sides of such apparatus.

SUMMARY OF THE INVENTION

This invention provides an improved apparatus for angularly displacing articles and, particularly, for tilting or inverting glass containers that is simple yet dependable, can be utilized without necessity for providing different processing levels, is well suited for high-speed operation, is compact, and does not require floor mounting.

It is therefore an object of this invention to provide an improved apparatus for angularly displacing articles.

It is another object of this invention to provide an improved apparatus for tilting and/or inverting glass containers.

It is still another object of this invention to provide a simple yet dependable apparatus for tilting and/or inverting glass containers at high speeds and/or with the container, if inverted, being at the same level as before inversion.

It is still another object of this invention to provide an improved apparatus for tilting and/or inverting glass containers wherein the containers may be easily inspected.

It is yet another object of this invention to provide an improved apparatus for tilting and/or inverting glass containers that is compact and does not require floor mounting.

With these and other objects in view, which will become apparent to one skilled in the art as the description proceeds, this invention resides in the novel construction, combination and arrangement of parts substantially as hereinafter described, and more particularly defined by the appended claims, it being understood that such changes in the described embodiments of the hereindisclosed invention are meant to be included as come within the scope of the claims.

BRIEF DESCRIPTION OF THE DRAWINGS

The accompanying drawings illustrate several embodiments of the invention according to the best mode so far devised for the practical application of the principles thereof, and in which:

FIG. 2 is a top sectional view of the inverter taken through the lines 2—2 of FIG. 1;

FIG. 3 is an end view of the inverter shown in FIG. 1;

FIGS. 4 and 8 are sectional views of the support units illustrating support of each guide at about a 45° greater angle than the preceding support;

FIG. 9 is a partial top plan view of an alternate embodiment of the device of this invention shown mounted above a conveyor belt to tilt, or angularly displace, containers by 90° and then later re-orient the containers to their original position;

FIG. 10 is a front view of the tilting device shown in FIG. 9 with additional containers shown in the device for clarity in description;

FIGS. 11 through 18 are sectional views taken through lines 11—11 to lines 18—18, respectively, of the device shown in FIG. 10; and FIG. 19 is a partial top view of another alternate embodiment of the device of this invention similar to that shown in FIG. 9 but adding uninterrupted front guides.

DESCRIPTION OF THE PREFERRED EMBODIMENT

Figure 1:
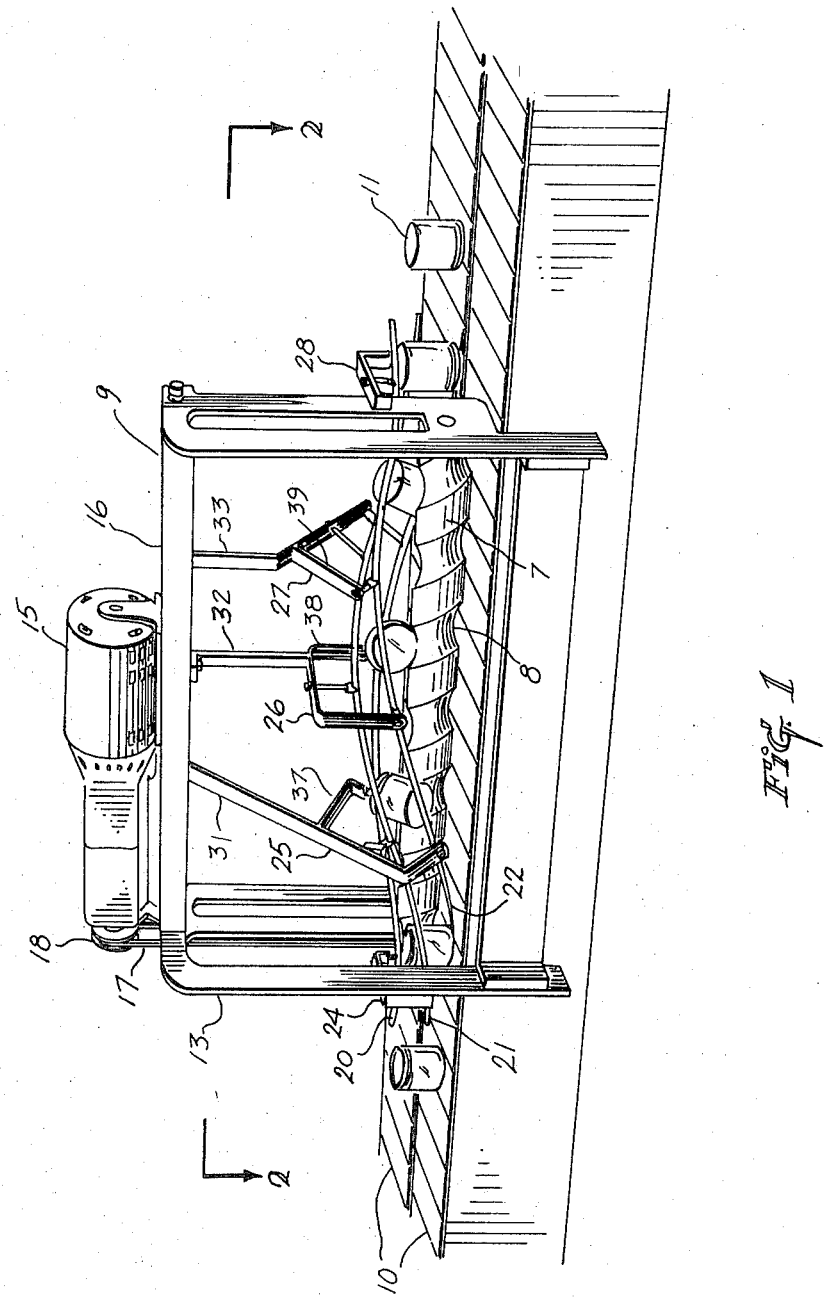
FIG. 1 is a perspective view of the device of this invention shown mounted above a conveyor belt to invert containers.

Referring now to FIGS. 1 through 8 of the drawings, a worm conveyor 7 having a plurality of helical grooves 8 is supported for rotation about a horizontal axis in a frame 9 that is preferably mounted slightly above a horizontal conveyor belt 10 of the type normally used to transport glass containers 11 in single file from one point to the other, as for example, from a lehr to an inspection station, or from one inspection station to another inspection station or a packing station. As shown in the drawings, a plurality of adjacent conveyors 10 are utilized, but it is to be realized that a single conveyor could be used, if desired.

Worm conveyor 7 is preferably of a material that will avoid damage to the containers to be inverted, and is preferably formed of paper phenolic, hard rubber, or nylon, for example. In addition, worm conveyor 7 has a shaft 12 that extends beyond end 13 of frame 9 with said shaft having a pulley 14 fixed thereto. A conventional motor 15 is mounted on the top 16 of frame 9 and belt 17 extends between motor pulley 18 and pulley 14 so that motor 15 rotates worm conveyor 7.

Three guide members 20, 21, and 22, preferably nylon or graphite-impregnated nylon rods, are supported in spaced relationship with respect to said worm conveyor 7. As shown in FIGS. 1 through 8 of the drawings, each guide member is curved to define a helix which is directed substantially oppositely to that defined by the grooves 8 formed in worm conveyor 7, and each guide member is curved about the worm conveyor through about 180° from end to end so that the worm conveyor is received between the guides. A series of five supports 24 through 28 are spaced along the length of worm conveyor 7 with each successive support providing an offset for the guides through angles of 45° with respect to the preceeding guide support (as shown in FIGS. 4 through 8 which illustrate how the guides are positioned at each successive support position). While the rods may be flexible before being held in place by the supports, as would be the case with graphite-impregnated nylon rods, they are substantially rigid when supported by supports 24 through 28.

As seen best in FIGS. 4 through 8, each of the supports 24 through 28 includes a hanger portion 30 through 34, respectively, conventionally secured, as by bolts, at one end to frame 9 (as shown in FIGS. 1, 2, and 3, hanger portions 30 and 34 of supports 24 and 28, respectively, are fastened to the ends of frame 9, while hanger portions 31, 32, and 33 of supports 25, 26, and 27, respectively, are fastened to the top of frame 9).

Angle brackets 36 through 40 are conventionally secured, as by welding, to hanger portions 30 through 34, respectively. As shown best in FIGS. 4 through 8, angle brackets 36 and 40 are generally L-shaped, while angle brackets 37, 38, and 39 are generally U-shaped.

Each of the angle brackets supports a plurality of spaced holder units 42 each of which includes a shaft 46, one end of each of which has screw threads thereon and is received in openings in the angle brackets with bolts 47 and 48 at opposite sides of each bracket so that the length of the shaft is thereby adjustable to thus permit different sizes of containers to be inverted.

At the inward end of each shaft 46 of the holder units 42 is a guide holder 50 secured thereto, by any appropriate means. Guide holder 50 has a groove 51 dimensioned appropriately to support one of the guide members securely therein. When secured within groove 51, the particular guide member is supported for engagement with a surface of a glass container 11 passing between the guide members and the worm conveyor 7.

Although each of the holder units 42 may be identical, it should be readily noted that the number thereof attached to a particular angle bracket varies as needed. Thus, on supports 24 and 28, at the beginning and the end of the inverter, respectively, only two holder units 42 are provided. In this connection, it should be noted that the glass container is supported by the conveyor and, hence, no third holder is needed. With respect to supports 25, 26, and 27, which are intermediate the ends of the converter, however, the container is no longer in contact with the conveyor and, hence, three guides are utilized and, hence, three supports are provided.

As shown in FIG. 1, the horizontal conveyor belt (moving from left to right) transports glass containers to be inverted. The containers are received between worm conveyor 7 (turning in a counter-clockwise direction as viewed from the left end of the apparatus) and the guides. As the container passes support 24, guide 20 is contiguous to the finish surface of the container while guide member 21 is contiguous to the side of the container opposite the worm conveyor. The container then seats itself within a groove 8 in the worm conveyor 7. Since the worm conveyor 7 is rotating and since the guides are curved partially around the worm conveyor, and more particularly over it, the container is lifted from the conveyor belt. As the container reaches support 25 it is no longer supported, at its bottom surface, by the horizontal conveyor belt and is supported by guide member 22 as the motion of the container, together with the rotation of worm conveyor 15, continues. The container continues to be supported in this manner as it rotates further, passing by succeeding supports 26 and 27. Finally, as the container passes support 28, the finish surface of the container is supported by the horizontal conveyor belt as the container has now been completely inverted.

If desired, screw 7 can be elongated (not shown) at the entrance end of the apparatus and a finger (not shown), preferably of nylon or the like, positioned adjacent to the screw so that incoming containers are positioned therebetween and resulting in the finger causing positive engagement of the containers with the screw. This positive engagement of the container with the screw results in the container being lifted slightly prior to engagement with lower guide 22 to assure smooth transfer from the conveyor to the inverting apparatus.

Referring now to FIGS. 9 through 18 of the drawings, an alternate embodiment of the invention is shown for tilting the glass containers so that the containers are angularly displaced about 90° and then later causing the containers to be angularly displaced in the opposite direction by the same number of angular degrees whereby the containers are re-oriented to assume their original positions (which is normally the upright position). Tilting of the containers in this manner permits inspection of the bottoms of the containers, for example.

As shown in partial form in FIGS. 9 and 10, worm conveyor 107 has a plurality of helical grooves 108 therein in which grooves the glass containers 111 on conveyor belt 110 are received in the same manner as described with respect to the embodiment of the invention shown in FIGS. 1 through 8. Since the worm conveyor is supported and driven in the same manner as described with respect to the embodiment of the invention shown in FIGS. 1 through 8, and since the guides are supported in a like manner, the support and driving structures have been omitted from FIGS. 9 and 10.

Guide members 120, 121, and 122 are curved but differ from guides 20, 21, and 22 which are described in connection with the embodiment of the invention shown in FIGS. 1 through 8. As shown in FIGS. 9 and 10, guide 120 is positioned above incoming and discharged containers on conveyor belt 110 at both the infeed and discharge ends of the device, while the worm conveyor 107 is positioned at the side of the containers and is rearwardly of the containers as shown in FIGS. 9 through 18. From each end of the device, guide 120 is curved upwardly and over the worm conveyor and, thus, upwardly and rearwardly where the worm conveyor is behind the containers initially, so that at the central portion of the drive guide 120 is above but rearwardly of the worm conveyor. Thus, guide 120 is curved first in one direction and then in the opposite direction with a like curvature so that containers are angularly displaced, or tilted, and then returned to their original positions.

Guide member 121 extends from in front of the worm conveyor 107 at each end of the device so that incoming and discharged containers are between guide 121 and the worm conveyor. Guide 121 is then curved in opposite directions from the ends of the device in the same manner and with the same spiral curvature of guide 120 except that guide 121 terminates short of the center of the device and at termination is directly above the worm conveyor.

Guide member 122 extends from below the worm conveyor (or nearly so) at each end of the device forwardly and upwardly to terminate short of the central portion. At the point of termination, guide 122 is forwardly of the worm conveyor and containers are lifted by bottom contact with the curved portion of guide member 122 at the infeed end of the device and are permitted slow re-orientation due to the opposite curvature at the discharge end of the device. The curvature of guide member 122 is like that of guide members 120 and 121, and guide 122 terminates short of the central portion of the device as does guide 121.

Thus, as shown best by FIGS. 11 through 18, as the worm conveyor 107 rotates with containers 110 in grooves 108 in the worm conveyor, each glass container is raised and tilted as it passes along the device from the in-feed end toward the discharge end. With the guides curved as shown in FIGS. 9 through 18, the angular displacement, or tilting, of the container is through an angle of 90°, after which the container is lowered and returned to its original upright position on the conveyor belt at the discharge end of the device. As shown in the embodiment of the device in FIGS. 9 through 18, the worm conveyor rotates clockwise, as viewed from the in-feed (right side as shown in FIGS. 9 and 10) end of the device, and the containers are raised and tilted over the worm conveyor so that at the central portion of the device the side of each container contacts the top of the worm conveyor and, thus, exposes the bottom of each container. By breaking or terminating guides 121 and 122 (or at least one of them), faulty containers can be readily removed from the device either manually or by automatic rejection devices (not shown) conventional in the field.

As shown in the embodiment of the invention according to FIG. 19, the device is identical to that shown in FIG. 9, except that a guide 221 is provided that is similar to guide 121 but having an additional portion to extend through the central portion of the device forwardly of the worm conveyor 107 and, hence, this additional portion is engageable with the bottom of the container throughout passage of the container through the central portion of the device. This optional guide 221 can, of course, be utilized where deemed necessary or desirable as, for example, to prevent a container from moving forwardly while angularly displaced by 90°. As also indicated in FIG. 19, guide 122 can be extended uninterrupted if desired to aid in container control.

The foregoing operation has been described within the framework of the several embodiments illustrated. It should be realized, however, that other equivalent variations of the illustrated apparatus are contemplated as being within the scope of the present invention. For example, the illustrated apparatus could be shortened or lengthened and supports deleted or added so that the apparatus provides other partial inversions or complete rotation of the container as desired to fulfill a particular need. Further, the worm conveyor could be formed from a material such that the particular dimensions of the groove formed therein are unimportant to the effective operation of the apparatus. Thus, the present invention is not in any way meant to be limited to the precise embodiments shown and described.

What is claimed is:

1. Apparatus for automatically altering the angular orientation of glass articles, comprising: three spaced guides at least a portion of each of which has two sections curved in a predetermined manner with said curvature of one of said sections being substantially the opposite of the other, two of the three spaced guides terminating short of the central portion of said guides; and rotatable drive means positioned within said guides and spaced therefrom a distance sufficient to receive articles to be angularly displaced therebetween, rotation of said rotatable drive means causing articles between said rotatable drive means and said guides to be angularly displaced about 90 degrees to permit the bottom of the articles to be inspected in one angular direction for a predetermined angular distance and then returned in the opposite angular direction to the original orientation.

2. Apparatus for automatically and temporarily angularly displacing glass containers for bottom inspection, said apparatus comprising: driven worm conveyor means adapted for engagement with a lateral surface of the containers; horizontal conveyor means adapted for frictional engagement with a lower surface of the container and positioned to convey containers thus engaged into engagement with said worm conveyor means and carry discharged containers away from said apparatus; and a plurality of guide means spaced from one another, said guide means having an infeed end portion curved in a predetermined manner and a discharge end portion curved oppositely to the curvature of said infeed end portion with said worm conveyor means being positioned within said guide means and rotatable in a direction to cause containers to be lifted at said infeed portion of said guide means and angularly displaced in a first direction to a position whereat the bottoms of said containers may be readily inspected and to cause said containers to be lowered at said discharge portion of said guide means and returned to the original upright position by angular displacement in the opposite direction with respect to said first direction for the bottoms to re-engage said horizontal conveyor means at said discharge portion.

3. The apparatus of claim 2 wherein said guide means are curved so that said containers are angularly displaced 90° and then returned to the upright position.

4. The apparatus of claim 2 wherein three guides are utilized and wherein one of said guides terminates short of a central portion and wherein another of said guides has a central portion extending forwardly of and above said rotatable drive means.

* * * * *